United States Patent [19]

Yoshida et al.

[11] Patent Number: 5,068,501
[45] Date of Patent: Nov. 26, 1991

[54] TAPE END SWITCH DETECTING DEVICE FOR TAPE PLAYER

[75] Inventors: Susumu Yoshida; Sei Onishi; Kenji Uchiyama, all of Saitama, Japan

[73] Assignee: Pioneer Electronic Corporation, Tokyo, Japan

[21] Appl. No.: 377,872

[22] Filed: Jul. 10, 1989

[30] Foreign Application Priority Data

Jul. 28, 1988 [JP] Japan ............................ 63-99078[U]

[51] Int. Cl.⁵ ............................................. H01H 3/16
[52] U.S. Cl. ................................................. 200/61.58 R
[58] Field of Search ............... 200/61.13–61.18, 200/61.58 R; 242/DIG. 1; 360/74.1, 74.2, 69, 137

[56] References Cited

U.S. PATENT DOCUMENTS 4,329,720  5/1982  Kodama ........................ 360/137 X Primary Examiner—J. R. Scott
Attorney, Agent, or Firm—Sughrue, Mion, Zinn, Macpeak & Seas

[57] ABSTRACT

A device for detecting the end of the tape indicating that the tape cassette is entirely wound on one reel so that the reels are prevented from rotating further and such that the driving direction is reversed. The tape end detecting device includes a switch for indicating the end of the tape, a rotatable wheel responsive to the driving of the tape so as to rotate in a predetermined direction irrespective of the direction in which the tape is driven, a pivotable arm engageable at one end with the rotatable wheel and movable in a forward and backward direction, a rotatable cam member including a movable cam engageable with a pin of the pivotable arm to pivotably move the pivotable arm and an urging cam for urging the pin when the pivotable arm does not pivot and an operating portion mounted on the pivotable arm operating the switch when the pin is urged by the urging cam.

2 Claims, 8 Drawing Sheets

TAPE END SWITCH DETECTING DEVICE FOR TAPE PLAYER

BACKGROUND OF THE INVENTION

1. Field of the Invention

This invention relates to a tape end detecting device for a tape player which detects a tape end condition in which the tape of a tape cassette is entirely wound on one reel so that the reels are prevented from further rotation, and changes the driving direction of the tape.

2. Background

Figure 1:
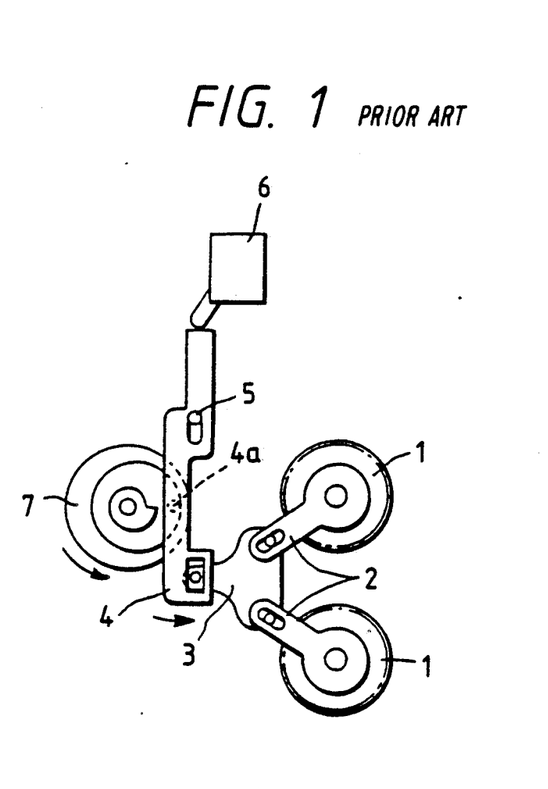
FIG. 1 is a schematic plan view of a conventional tape end detecting device.

A conventional tape end detecting device of this type is shown in FIG. 1. Referring thereto. reference numeral 1 denotes reel bases for rotating reels of a tape cassette so as to wind and rewind the tape. A back tension mechanism is contained in the reel base 1. When the tape is entirely wound on one reel, a force applied by the back tension mechanism to angularly move a reel arm 2 is reduced, the reel arm 2 being angularly movable about the axis of the reel base 1.

The two reel arms 1 are connected to a pivotable arm 3, and the arm 3 is pivotably moved in both directions by the angular movements of the reel arms 2. The pivoting movement of the arm 3 causes one sensing arm 4 to angularly move about a pin 5 in the direction of the arrow, with a pawl 4a of the sensing arm disposed in contact with an outer cam of a cam gear 7.

When the force causing the angular movement subsides, the pawl 4a of the sensing arm 4 is engaged with an inner cam of the cam gear 7, and the other end of the sensing arm 4 pushes a switch 6 to operate the same, thereby changing the direction of driving of the tape.

In the above-mentioned tape end detecting device for a tape player, at the time the tape end is encountered, the sensing arm 4 has to be operated by a weak back tension force acting on the reel base 1, and therefore the device must be operated under a very light load.

For this reason, improved surface roughness of holes in the parts as well as dimensional accuracy and precise assembly are required resulting in increased cost of machining and assembly.

SUMMARY OF THE INVENTION

The present invention seeks to solve the above problems of the conventional tape end detecting device for a tape player, and an object of the invention is to provide a tape end detecting mechanism which does not require a complicated linkage mechanism, and can positively operate even if the load under which the device operate is large. since a back tension produced in a reel base is not utilized.

The present invention relates to a tape end detecting device for a tape player which achieves the above object. When the reel bases rotate, one end of a pivotable arm, which is movable in forward and backward directions and is pivoted by a movable cam, is brought into contact with a rotatable wheel rotating in a predetermined direction. When the rotatable wheel is stopped, the pivotable arm is pulled by a urging cam so that a switch can be operated through this movement of the pivotable arm.

In the tape end detecting device for a tape player according to the invention, the pivotable arm is urged by the rotating movable cam in one direction. Simultaneously, when the movable cam ceases to urge the pivotable arm, the pivotable arm is returned through contact with the rotatable wheel. Thus, the pivotable arm continues to pivot, and the urging cam does not act on the pivotable arm when the rotatable wheel is rotating.

However, when the rotatable wheel stops, the pivotable arm is not returned by the rotatable wheel, and therefore the pivotable arm ceases to pivot and is pulled by the urging cam to operate the switch.

DETAILED DESCRIPTION OF THE PREFERRED EMBODIMENT

First, a drive device for driving reels of a reel cassette in which the invention is embodied will be described with reference to FIGS. 2 to 8.

Figure 2:
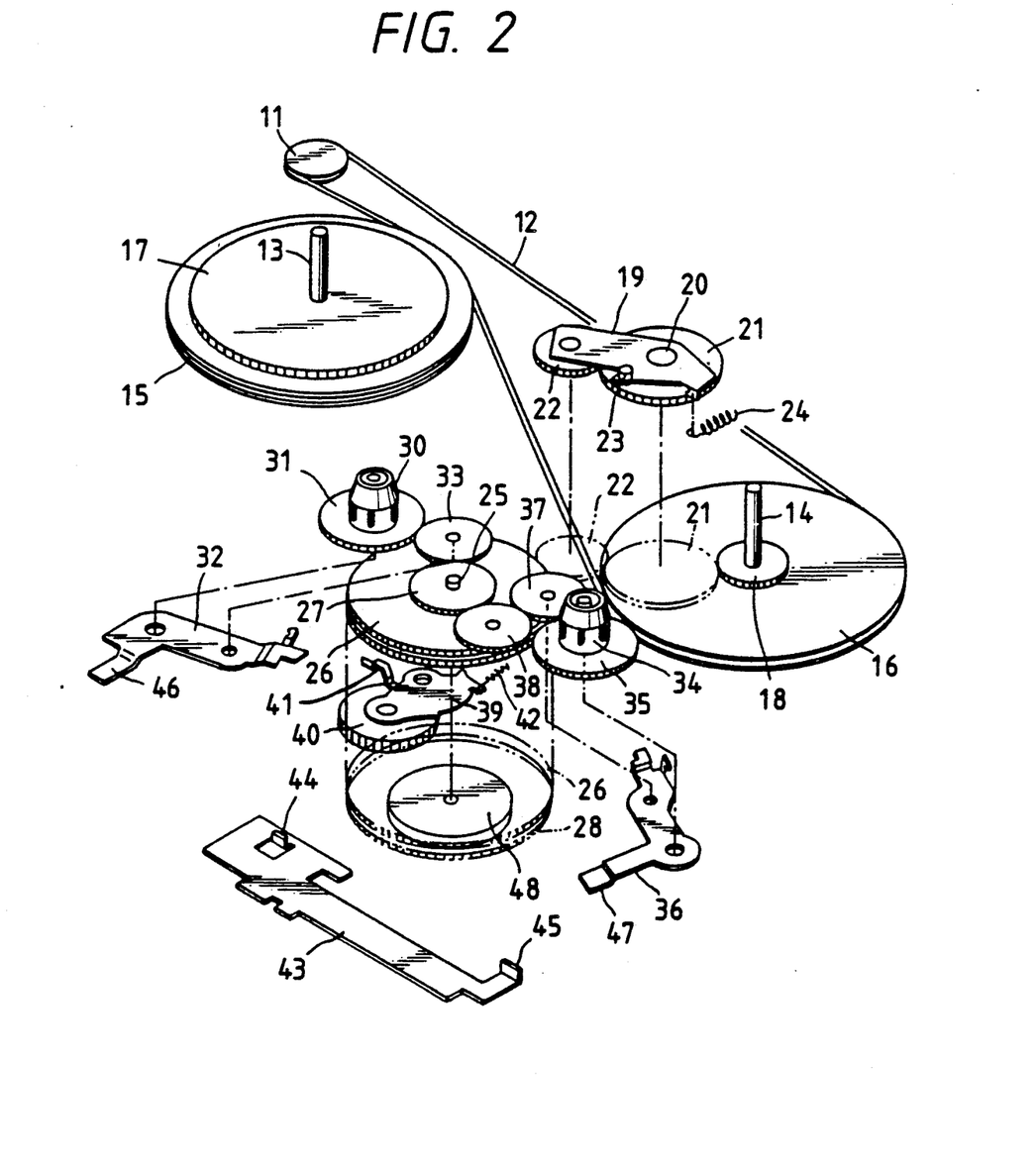
FIG. 2 is an exploded perspective view of the tape drive device.
Figure 3:
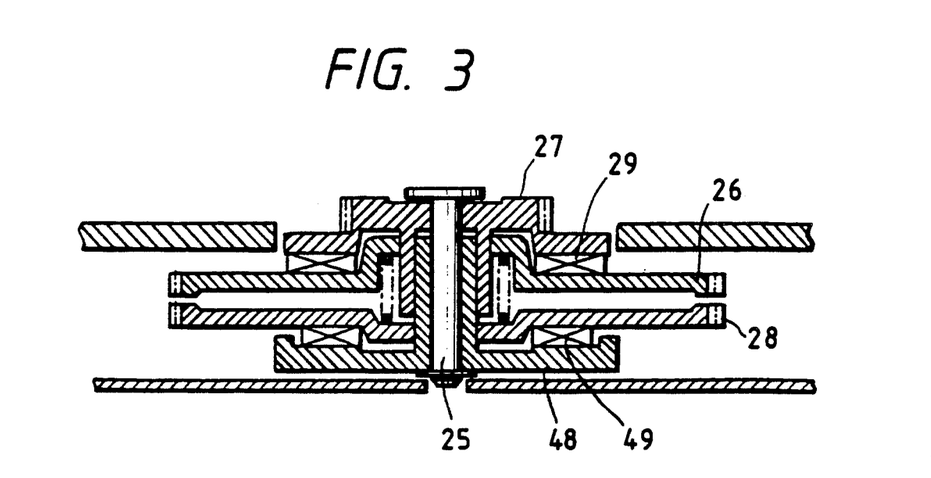
FIG. 3 is a cross-sectional view of an important part of the tape drive device.

A pulley 11 is connected to a drive motor, and a belt 12 extending around the pulley 11 drives pulleys 15 and 16 of forward and reverse capstans 13 and 14. The pulley 15 has an integral gear 17 of a greater diameter, and the pulley 16 has an integral gear 18 of a smaller diameter. An idler gear 21 is mounted on a shaft 20 which angularly movably supports an arm 19, and the idler gear 21 is in mesh with the smaller-diameter gear 18. A gear 22 mounted on the arm 19 is in mesh with the idler gear 21. The arm 19 has a pin 23 projecting therefrom, and can be rotated about the shaft 20 by operating the pin 23 against the bias of a spring 24.

When the pin 23 is not operated and the arm 19 is angularly moved by the bias of the spring 24, the gear 22 is in mesh with a first gear 26 rotatably mounted on a shaft 25. A slip member 29 such as felt is interposed between the first gear 26 and a second gear 27 rotatable together with the shaft 25.

With this arrangement, when a load applied to the second gear 27 increases, there occurs a slip between the slip member 29 and a gear 28, so that the rotational speed of the gear 27 either becomes lower than that of the first gear 28 or becomes zero.

A winding reel base 30 has an integral gear 31 which is in mesh with an intermediate gear 33 mounted on an arm 32 angularly movable about the axis of the winding reel base 30. The intermediate gear 33 is meshingly engageable with the second gear 27 when the arm 32 is angularly moved. A rewinding reel base 34 has an integral gear 35 which is in mesh with a gear 37 mounted on an arm 36 angularly movable about the axis of the rewinding reel base 34. When the arm 36 is angularly moved, the gear 37 is meshingly engageable with a gear 38 which is always in mesh with the second gear 27. Therefore, when the gear 27 is rotated in one direction, the winding reel base 31 and the rewinding reel base 34 are rotated in opposite directions through the intermediate gears 33, 37 and 38.

A gear 40 is rotatably mounted on an arm 39. When an operating portion 41 of the arm 39 is operated against the bias of a spring 42, the gear 40 is disengaged from the greater-diameter gear 17 and the gears 28 and 26. When the operating portion 41 is not operated, the gear 40 is in mesh with the greater-diameter gear 17 and the gears 28 and 26. The gears 28 and 26 are rotatably mounted on the shaft 25, and a slip member 49 such as felt is interposed between the gear 28 and a rotatable wheel 48 which is rotatable together with the gear 27. When the load of rotation of the second gear 27 increases, a slip between the rotatable wheel 48 and the gear 28, as well as a slip between the gear 27 and the gear 26 as described above, occurs. A slide plate 43 has projections 44 and 45 which respectively urge operating portions 46 and 47 of the arms 32 and 36 to angularly move the arms 32 and 36 against the bias of a spring (not shown).

Figure 4:
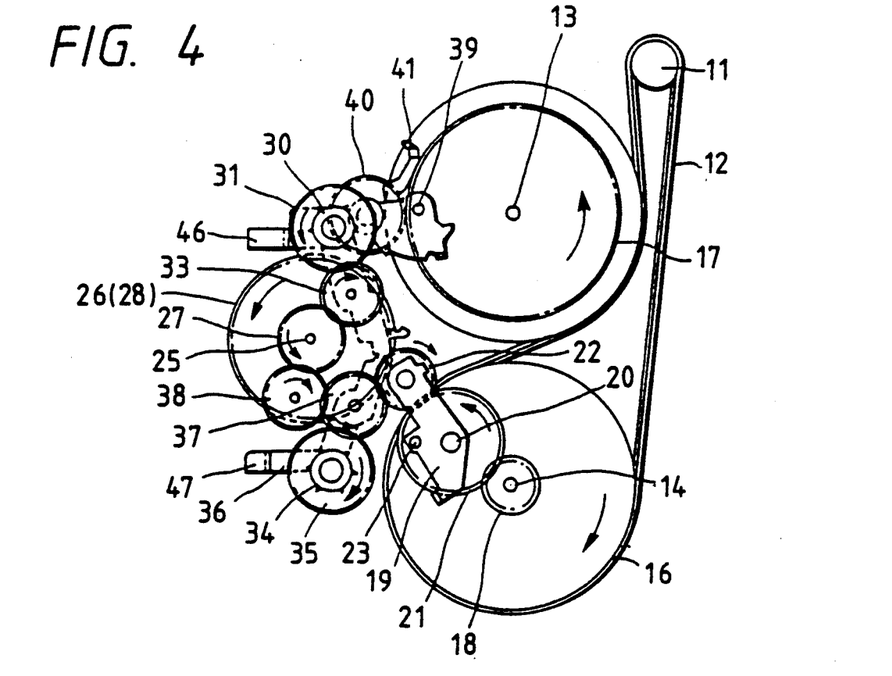
FIGS. 4 to 8 are plan views showing the operation of the tape drive device.

An automatic slack removing condition of this drive device will now be described with reference to FIG. 4. In this condition, the pin 23 of the arm 19 is not operated, and the arm 19 is angularly moved by the bias of the spring 24 to bring the gear 22 into meshing engagement with the first gear 26, thereby transmitting the rotation of the pulley 16 to the second gear 27. At this time, the operating portion 41 of the arm 39 is operated, so that the gear 40 is disengaged from the gears 28 and 26 and the greater-diameter gear 17.

Since the operating portions 46 and 47 of the arms 32 and 36 are disengaged from the projections 44 and 45 of the slide plate, the gear 33 on the arm 32 is in mesh with the second gear 27, and the gear 37 on the arm 36 is in mesh with the gear 38, so that the rotation of the second gear 27 is transmitted to the winding reel base 30 and the rewinding reel base 34 to rotate the same in directions of the illustrated arrows. Therefore, the second gear 27 is rotated relatively gently through the meshing engagement with the smaller-diameter gear 18 to rotate the two reel bases 30 and 34 in opposite directions to remove the slack of the tape. After the removal of the tape slack the slip member 29 slips relative to the second gear 27 to stop the rotation of the second gear 27, thus finishing the slack removing operation.

A playback condition in the forward direction will be described with reference to FIG. 5. In this case, the slide plate 43 shifts to the left in FIG. 1 from the aforesaid automatic slack removing condition, so that its projection 45 urges the operating portion 47 of the arm 36. As a result, the gear 37 is disengaged from the gear 38, so that the transmission of the rotation to the rewinding reel base 34 is stopped, but the other parts remain unchanged. Therefore, the winding reel base 30 rotates through the slip between the slip member 29 and the second gear 27 at a speed necessary to wind the tape.

Figure 5:
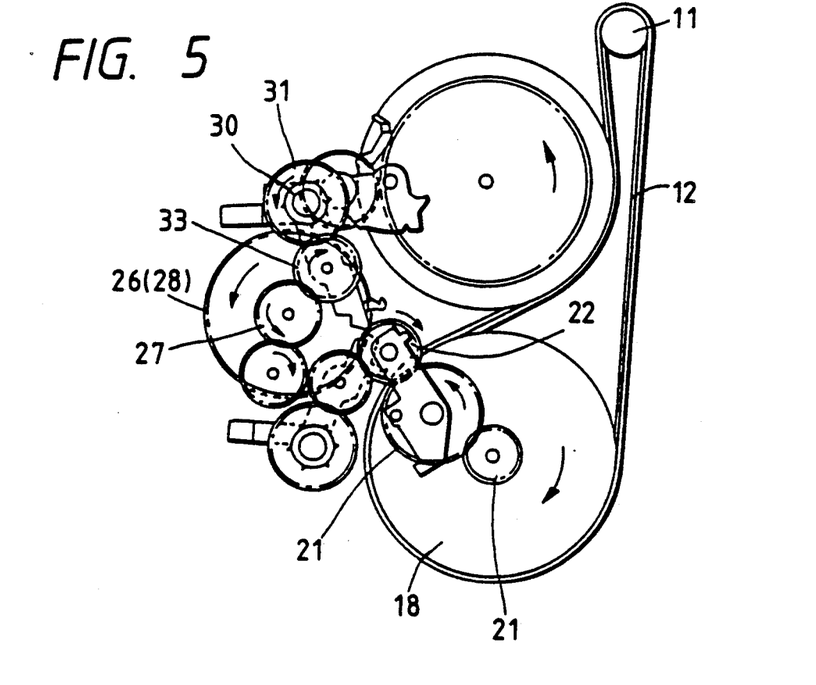
Figure 6:
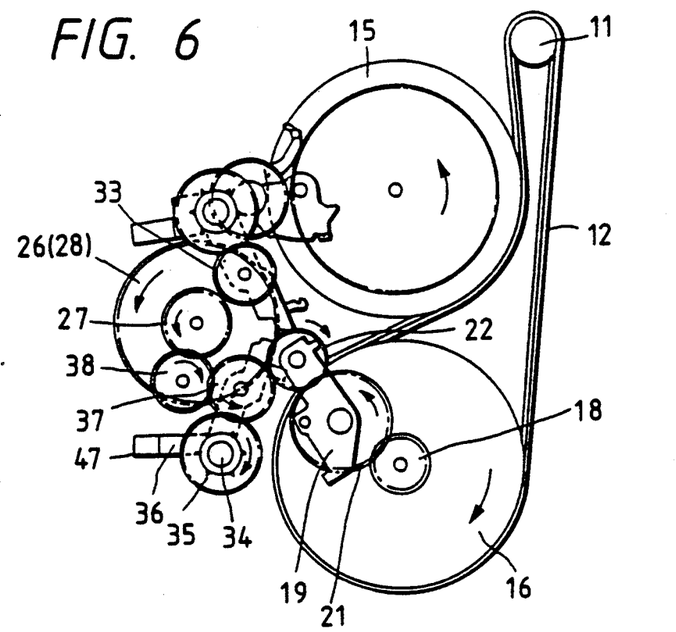
Figure 7:
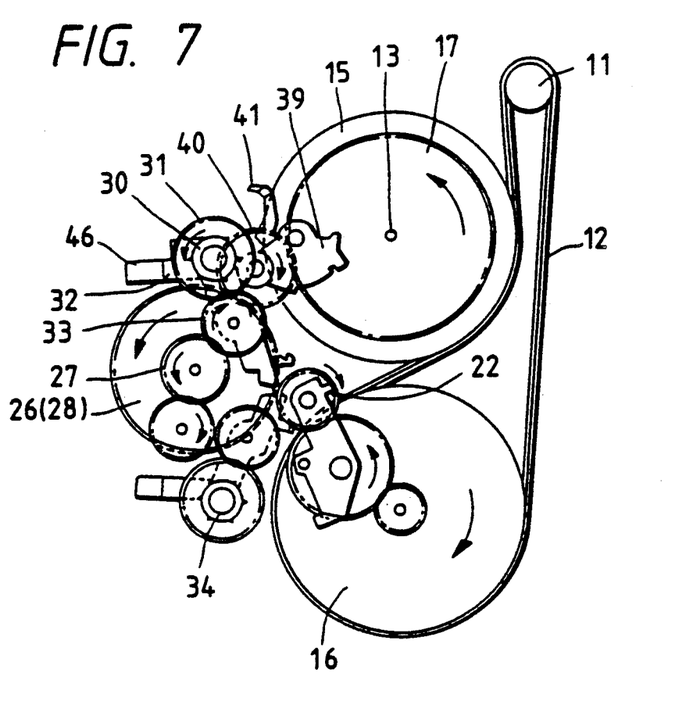

In the reverse playback, the slide plate 43 is operated in a reverse direction as shown in FIG. 6, so that its projection 44 urges the operating portion 46 of the arm 32 to disengage the gear 33 from the second gear 27. The other parts are in the same condition as in FIG. 4 and therefore in contrast with FIG. 5, the rewinding reel base 34 rotates at a speed necessary to wind the tape to thereby effect the reverse playback.

Figure 8:
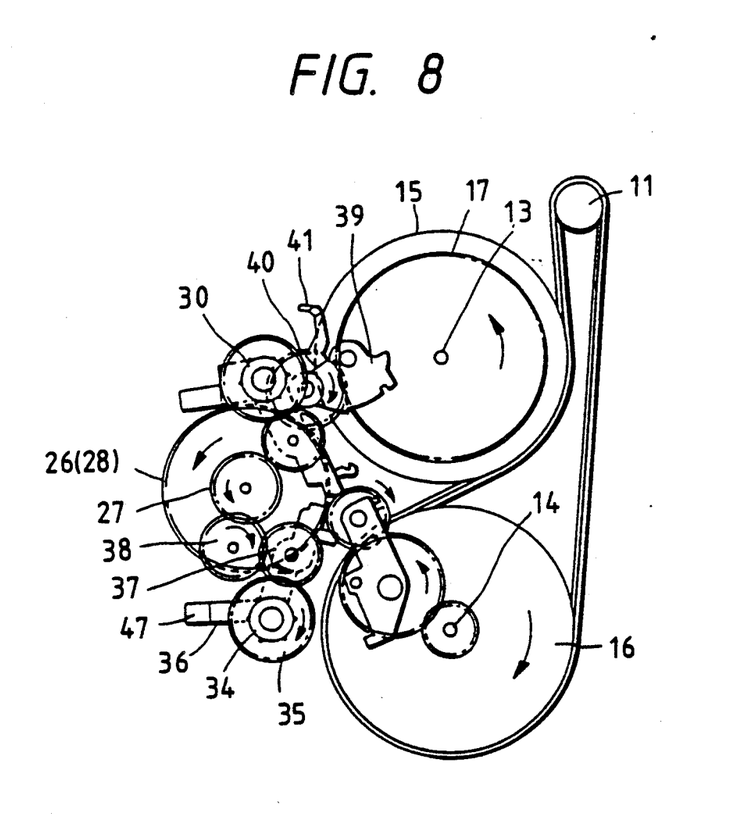

In the case of the fast winding, in contrast with FIG. 5, the pin 23 of the arm 19 is operated to disengage the gear 22 from the first gear 26 as shown in FIG. 8. Instead, the operation against the operating portion 41 of the arm 39 is released, so that the arm 39 causes the gear 40 to meshingly engage with the gear 28 and the gear 26 under the bias of the spring 38. Therefore, the second gear 27 rotates at a relatively high speed, and its rotation is transmitted to the winding reel base 30 by the gear 33, thereby effecting the fast winding.

When the tape has been wound on the reel by the fast winding, the slips occur by the slip member 49 between the rotatable wheel 48 and the gear 28 and the slip member 29 between the gear 26 and the gear 27, so that the rotatable wheel 48 and the gear 27 become stationary, thereby completing the fast winding.

In the case of the fast rewinding, in contrast with the fast winding of FIG. 8, the slide plate 43 is moved in the reverse direction as shown in FIG. 6, and the rewinding reel base 34 rotates at a high speed, thereby effecting the fast rewinding.

As described above, during the time when one of the winding reel base 30 and the rewinding reel base 34 rotates, the rotatable wheel 48 always rotates in one direction regardless of whether either of the two reel bases rotates. When the tape end condition is encountered as a result of the winding of the tape on one reel, the slip occurs by the provision of the slip members 29 and 49, so that the rotatable wheel 48 ceases to rotate.

The tape end detecting device of the present invention incorporated in the rotatable wheel 48 will now be described with reference to FIGS. 9 to 13.

A pivotable arm 51 has a contact member 50 mounted on one end thereof and engageable with the rotatable wheel 48. A shaft 52 is received in a slot 53 in the arm 51 so that the pivotable arm 51 is pivotably movable about the shaft 52. A spring 54 connected to the pivotable arm 51 urges the contact member 50 into contact with the rotatable wheel 48. A pin 56, which is received in a hole 55 of an irregular shape formed through the pivotable arm 51, limits the pivoting movement and the forward-and-backward movement of the pivotable arm 51 to a predetermined range. A pin 57 projects from the pivotable arm 51, and is in contact with a movable cam 59 having a heart-shape on a gear 58, the gear 58 being rotated in a direction of an arrow F by the motor for driving the above-mentioned drive device. Therefore, the pin 57 is urged by the cam 59 in a direction of an arrow A illustrated in FIG. 9.

Figure 9:
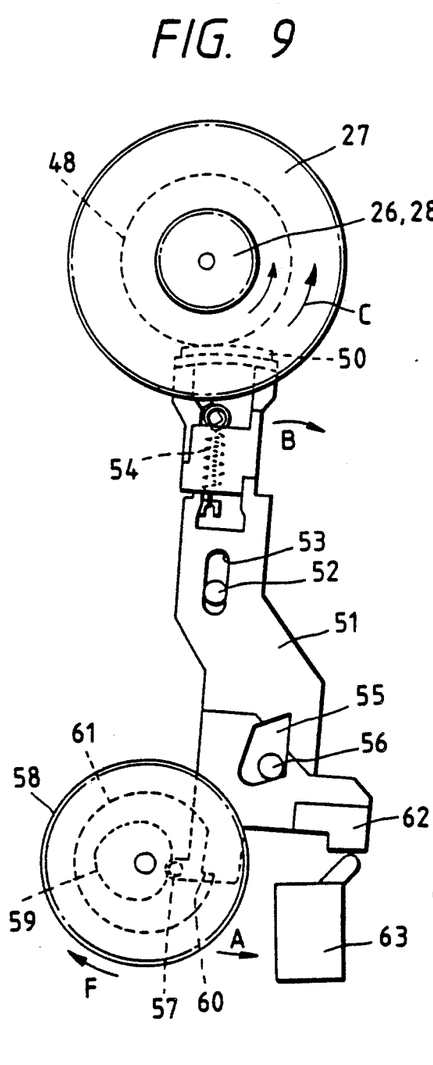
FIGS. 9 to 13 are plan views of a preferred embodiment of the present invention, showing the operation of the tape drive device.
Figure 10:
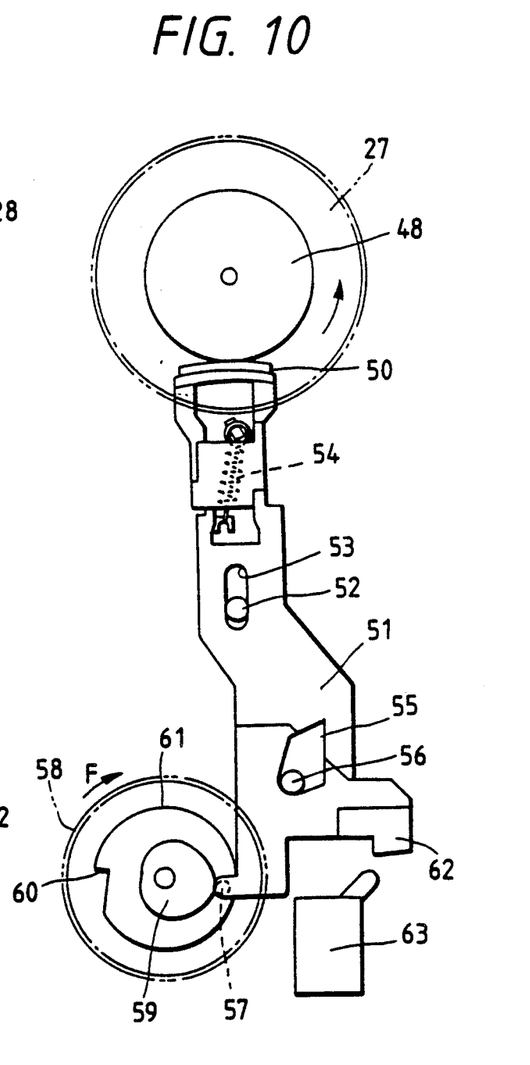

However, the rotatable wheel 48 rotates in a direction of an arrow C in FIG. 9 and urges the contact member 50 in a direction of an arrow B. Therefore, after the pin 57 reaches the apex of the movable cam 59, the arm 51 is returned by the force exerted on the contact member 50 in the direction of the arrow B, so that the arm 51 pivots repeatedly. When the tape end condition is encountered, the rotatable wheel 48 ceases to rotate as described above, and therefore the force acting on the pivotable arm 51 in the direction of the arrow B is terminated. As a result, after the pin 57 reaches the apex of the movable cam 59, the arm 51 is maintained in that position.

Figure 11:
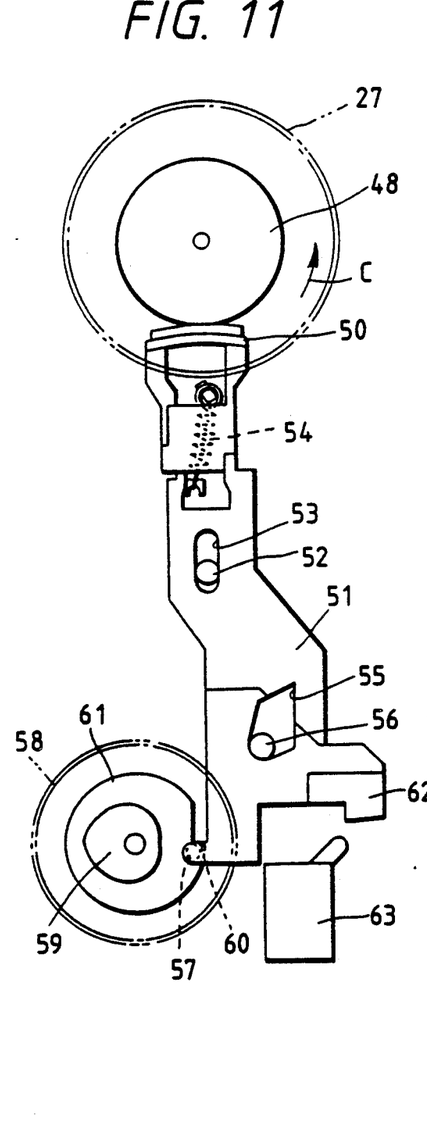
Figure 12:
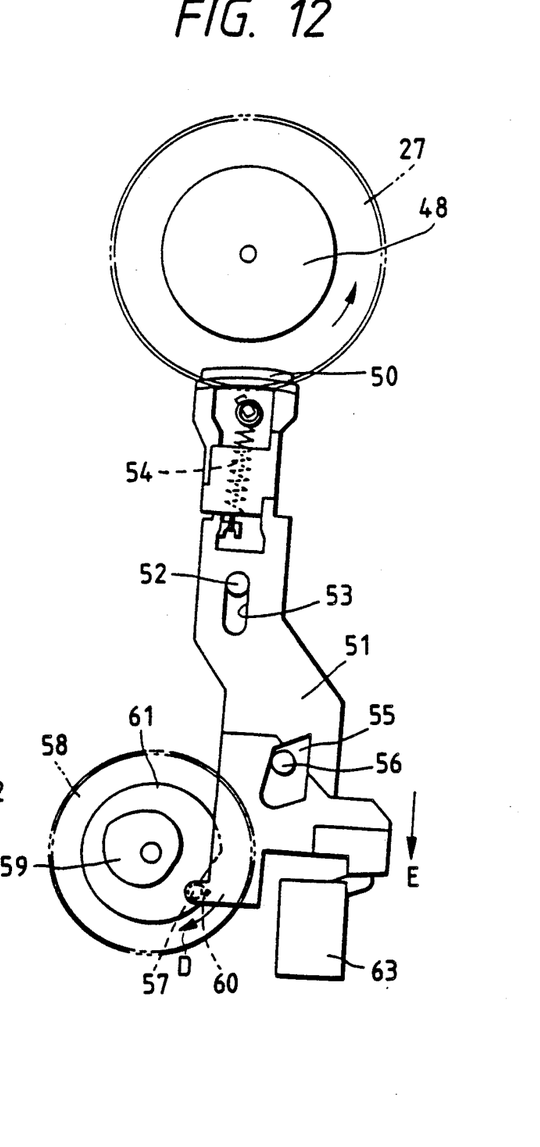

An urging cam 61 is formed on the gear 58 having an outer periphery disposed around the movable cam 59, the urging cam 61 having a projecting portion 60. Therefore, the pin 57 of the pivotable arm 51 remaining stationary is engaged with the projecting portion 60 of the urging cam 61, as shown in FIG. 11. Since the pin 57 is urged in a direction of an arrow D (FIG. 11), the pivotable arm 51 is moved in a direction of an arrow E, so that a push piece 62 pushes a switch 63 to operate the same.

Figure 13:
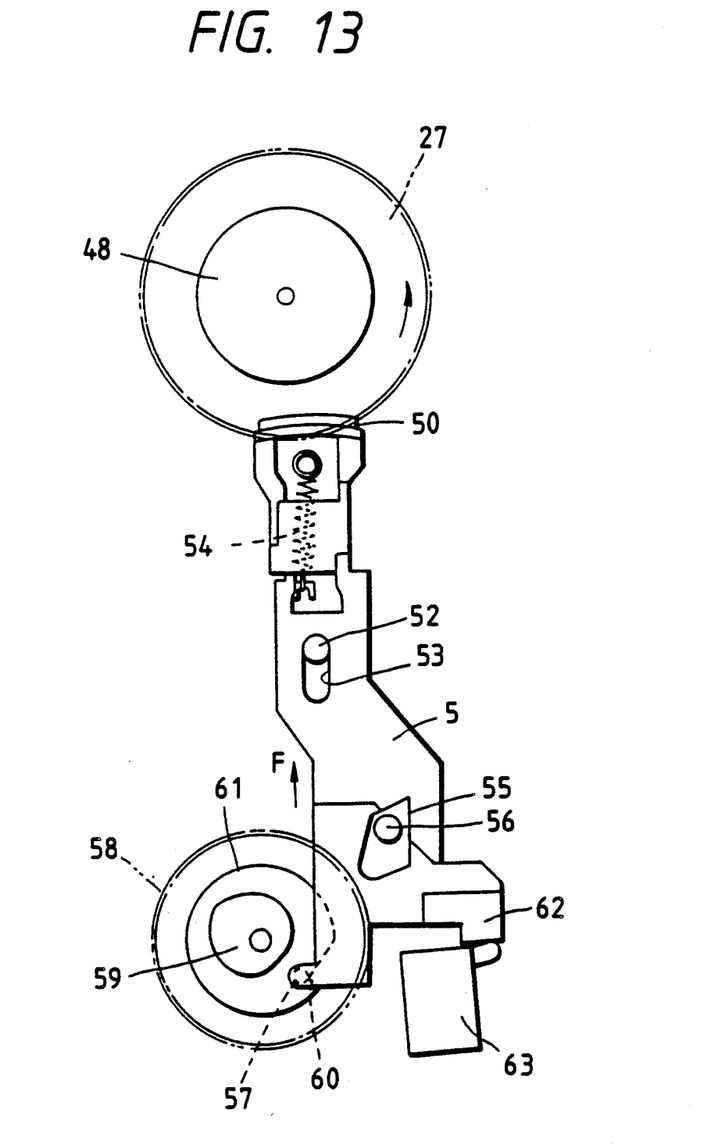

Upon a further rotation of the gear 58, the pivotable arm 51 is moved in a direction of an arrow F shown in FIG. 13 by the bias of the spring 54, with the pin 57 disengaged from the projected portion 60, so that the contact member 50 is again brought into contact with the rotatable member 48.

As described above, in the present invention, the switch for detecting the tape end so as to change the direction of driving of the tape is not operated utilizing the back tension torque developing in the reel base, as is the case with the prior art. Rather, the pivotable arm is moved by the force of engagement between the urging cam and the pin to operate the switch. Therefore, even if the load of operation of the parts including the switch is large, this operation can be positively effected, thereby providing a reliable operation.

Moreover, there is not employed a complicated linkage mechanism, as is the case with the prior art, resulting in lower cost.

What is claimed is:

1. A tape end detecting device for operating a switch when a tape in a tape player reaches the end of its travel, said tape end detecting device comprising:

a wheel rotating in one direction irrespective of the direction of travel of the tape;

a pivotable arm pivotable about a pivot point thereof and having a first surface engageable with said wheel, whereby said wheel provides a biasing force to pivot said pivotable arm in a first angular direction about said pivot point when said wheel is rotating and in engagement with said first surface;

means biasing said pivotable arm to urge said first surface to engage said wheel;

cam follower means attached to said pivotable arm at a point thereon on the opposite end of said pivot point from said surface;

cam means engageable with said cam follower for causing said pivotable arm to actuate said switch when said wheel stops rotating.

2. A tape end detecting device as claimed in claim 1, wherein said cam means comprises:

first cam means engageable with said cam follower means to cause said pivotable arm to pivot reciprocably when engaged with said cam follower;

second cam means engageable with said cam follower to cause said first surface to disengage from said wheel and to cause said pivotable arm to actuate said switch; wherein said first and second cam means and said cam follower means are positioned with respect to one another so that said cam follower engages with said first cam when said wheel is rotating and is applying said biasing force to pivot said pivotable arm, and disengages with said first cam and engages with said second cam when said wheel stops rotating and said biasing force is removed.

* * * * *